United States Patent

Kobayashi

[11] Patent Number: 5,826,211
[45] Date of Patent: Oct. 20, 1998

[54] ELECTRONIC CONTROLLER HAVING EXCELLENT CONTROL PROGRAM AND CONTROL DATA OVERWRITING CAPABILITIES

[75] Inventor: Masayuki Kobayashi, Anjo, Japan

[73] Assignee: Denso Corporation, Kariya, Japan

[21] Appl. No.: 754,915

[22] Filed: Nov. 22, 1996

[30] Foreign Application Priority Data

Dec. 4, 1995 [JP] Japan ................................ 7-315388

[51] Int. Cl.⁶ .............................. G06F 19/00; G06G 7/70
[52] U.S. Cl. .............................. 701/115; 701/1; 701/99; 701/102; 123/480; 123/486
[58] Field of Search .................... 701/29, 32, 33, 701/102, 103, 104, 48, 100, 115; 364/200, 900

[56] References Cited

U.S. PATENT DOCUMENTS

| | | | |
|---|---|---|---|
| 4,730,256 | 3/1988 | Niimi et al. | 364/431.12 |
| 4,785,425 | 11/1988 | Lavelle | 365/52 |
| 4,908,792 | 3/1990 | Przybyla et al. | 364/900 |
| 5,247,446 | 9/1993 | Motz et al. | 364/431.12 |
| 5,278,759 | 1/1994 | Berra et al. | 364/424.01 |
| 5,327,344 | 7/1994 | Hoffman et al. | 364/424.03 |
| 5,369,581 | 11/1994 | Ohsuga et al. | 364/424.01 |
| 5,428,532 | 6/1995 | Yasuno | 364/424.05 |
| 5,523,948 | 6/1996 | Adrain | 364/431.01 |
| 5,586,034 | 12/1996 | Takaba et al. | 364/431.04 |
| 5,602,738 | 2/1997 | Sasaki | 364/431.12 |
| 5,648,902 | 7/1997 | Honda | 364/424.034 |
| 5,670,845 | 9/1997 | Grant et al. | 315/77 |

FOREIGN PATENT DOCUMENTS

| | | |
|---|---|---|
| 6-272611 | 9/1994 | Japan . |
| 7-27036 | 1/1995 | Japan . |
| 7-191841 | 7/1995 | Japan . |

OTHER PUBLICATIONS

U.S. application No. 08/686699, Hayashi et al., filed Jul. 1996.

Primary Examiner—William A. Cuchlinski, Jr.
Assistant Examiner—Timothy R. Wyckoff
Attorney, Agent, or Firm—Nixon & Vanderhye P.C.

[57] ABSTRACT

An ECU is equipped with multiple microprocessors. Each microprocessor has an erasable ROM. A communication port of a first microprocessor is connected via an external communication line to a memory overwriter while another communication port of the same microprocessor and a communication port of a second microprocessor are connected to each other via an internal communication line. Before overwriting the contents of the ROM, each microprocessor stores its own identification number whose value is obtained by incrementing the identification number received from the memory overwriter and sending the incremented identification number to the next stage microprocessor. In this way, there is no need to store the identification numbers beforehand in nonerasable memory regions inside the microprocessors.

29 Claims, 5 Drawing Sheets

ELECTRONIC CONTROLLER HAVING EXCELLENT CONTROL PROGRAM AND CONTROL DATA OVERWRITING CAPABILITIES

CROSS-REFERENCE TO RELATED APPLICATION

This application is related to and claims priority from Japanese Patent Application No. Hei-7-315,388, the contents of which are hereby incorporated by reference.

BACKGROUND OF THE INVENTION

1. Field of the Invention

The present invention relates to an electronic controller that is equipped with a plurality of microprocessors that execute a variety of control processes. In particular, the present invention relates to an electronic controller which includes microprocessors whose control programs and control data can be overwritten.

2. Description of Related Art

One proposed electronic controller for controlling an engine of an automobile, as disclosed in, for example, Japanese Patent Application Laid-Open Publication No. Hei-6-272611, includes a microprocessor that has a nonvolatile memory such as flash EEPROM or the like whose control program and control data can be overwritten even after the vehicle is manufactured.

That is, in this type of electronic controller, during ordinary use, the microprocessor executes a control process for controlling a target such as an engine in accordance with the control program and control data that are stored in the nonvolatile memory. Meanwhile, when the control program or control data are to be overwritten, a separately provided memory overwriter is connected to the electronic controller, whereby this memory overwriter and a communication circuit provided in the microprocessor are connected so that they can communicate with each other. Upon receipt of an external overwrite command, the microprocessor thereafter executes an overwriting process which involves receiving a new control program or control data transmitted from the memory overwriter and overwriting the control program or control data that is presently stored in the nonvolatile memory with the newly received control program or control data.

Therefore, with the above-mentioned electronic controller, the contents of the electronic controller can be overwritten easily in the event there is a need to change its operation (i.e., control operation contents of the memory) after it goes on the market.

Meanwhile, in recent years, with increasing complexity in the control operations for this type of electronic controller, those controllers which have a plurality of microprocessors are being used predominantly. The technology disclosed in the above-mentioned Publication fails to satisfy the need to be able to overwrite the control program, control data or the like of the plurality of microprocessors.

Figure 7:
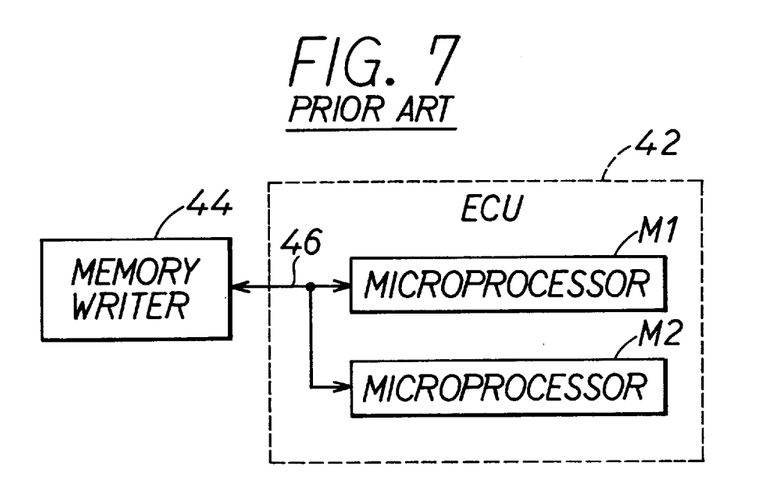
FIG. 7 is a block diagram of a conventional electronic controller.

That is, when the above-mentioned conventional technique is applied to the electronic controller that is equipped with a plurality of microprocessors, as illustrated in FIG. 7, each of the microprocessors M1 and M2 that have been installed in the electronic controller 42 will have to be connected to a memory overwriter 44 using a common communication line 46. Accordingly, each microprocessor M1, M2 cannot determine whether a new control program or control data from the memory overwriter 44 is intended for its own use, and thus, it will be impossible to selectively overwrite the control program or control data in each of the microprocessors M1 and M2.

Accordingly, in order to solve this problem, for example, one may consider a construction in which an identification number is stored beforehand in a nonerasable memory region (ordinary ROM region) within each microprocessor, and whereby the control program or control data stored in the nonvolatile memory are overwritten by executing an overwriting process for overwriting the control program or control data in the nonvolatile memory only when an identification number transmitted from the memory overwriter is identical to the identification number of the microprocessor.

Thus, if the above-described construction is adopted, the control programs in each of the microprocessor can be overwritten by transmitting the identification number that indicates the microprocessor whose contents will be overwritten to the electronic controller along with the new control program or control data.

However, with the above-described construction, it will be difficult to assemble and handle the electronic controller in maintenance operations after it goes on the market when there is an increase in the number of types of microprocessors inside the electronic controller. For example, there is a need to keep track of the correspondence between the identification number and the control program or control data to be stored in each microprocessor at all times. In addition, if microprocessors that are loaded in other types of electronic controllers for controlling other objects are also considered, the number of identification numbers becomes increasingly large and thus, it will be extremely difficult to handle such electronic controllers.

On the other hand, instead of storing the identification number in the nonerasable memory region, one option is to append the identification number to the control program or control data itself that is stored in the erasable nonvolatile memory of each microprocessor.

However, even with this type of arrangement, there is still a need to accurately record the correspondence between the identification number and the control program or control data and thus, there will still be difficulties in handling and maintenance.

SUMMARY OF THE INVENTION

In view of the foregoing problems in the prior art, it is an object of the present invention to provide an electronic controller which includes a plurality of microprocessors whose control program, control data or the like can be overwritten simply and reliably.

To achieve the foregoing object, a first aspect of the present invention provides an electronic controller for performing various control operations based on control codes. The electronic controller includes a plurality of microprocessor units and a common communication line. Each of the microprocessor units includes a nonvolatile memory for storing control codes. The common communication line is for connecting the plurality of microprocessor units in series to form a sequence. Each of the microprocessor units executes a first process when an overwrite command is received from outside. The first process involves receiving an overwrite identification code from outside, performing a predetermined operation on the overwrite identification code to obtain a processed code, setting the processed code as its self identification code and sending the processed code to a next microprocessor unit in the sequence. Each of the microprocessor units executes a second process when a new control code, which includes a new identification control code, is received from outside. The second process involves sending a new control code to a next microprocessor unit in the sequence, determining if the new identification control code matches the self identification code and overwriting the control code stored in the nonvolatile memory when the new identification control code matches the self identification code.

One of the microprocessors is connected to an external communication line that extends to an outside of the electronic controller while the internal communication line sequentially connects the microprocessors with each other.

When overwriting the control program and control data stored in the nonvolatile memory of any one of the microprocessors, it suffices to execute the following items numbered (1) and (2). It is to be noted that in the following explanation the symbol f( ) represents a value that is obtained after performing the calculation "f" with respect to the value inside the parentheses ( ).

(1) First, after transmitting an overwrite command to each one of the microprocessors, an identification number n is transmitted via the external communication line to the electronic controller.

In this way, the microprocessor that is connected to the external communication line (hereinafter referred to as a "first stage microprocessor") receives via the communication circuit the identification number n that is transmitted via the external communication line, stores the value f (n) as its own identification number which is obtained by performing the predetermined operation f on the received identification number n and transmits the identification number f(n) to the next microprocessor in the sequence via the internal communication line.

Thereafter, the microprocessor (hereinafter referred to as a "second stage microprocessor") which comes after the first stage microprocessor that is connected to the external communication line also executes the first process and thereby receives the identification number f(n) transmitted from the first stage microprocessor via the internal communication line, stores as its own identification number the value f(f(n)) which is obtained by performing the predetermined calculation f on its received identification number f(n), and transmits the identification number f(f(n)) resulting from the performance of the calculation f to a next stage microprocessor (hereinafter referred to as a "third stage microprocessor").

In this way, each microprocessor executes the first process sequentially. As a result, each microprocessor stores the identification number that represents the value that corresponds to their order of connection along the internal communication line in such a manner that the first stage microprocessor stores f(n) as its own identification number, the second stage microprocessor stores f(f(n)) as its own identification number, and the third stage microprocessor stores the f(f(f(n))) as its own identification number.

(2) Next, the new control program or control data that will replace the existing control program or data is transmitted from the external communication line to the electronic controller together with the identification number that indicates any one of the microprocessors whose control program or control data will be overwritten. It is to be noted that in the following explanation f(f(n)) which is the identification number of the second stage microprocessor is transmitted as the identification number.

Then, by executing the second process, the first-stage microprocessor receives via the external communication line the new control program or control data that is transmitted along with the identification number f(f(n)), and transmits the received identification number f(f(n)) and new control program or control data to the next stage microprocessor (i.e., the second stage microprocessor) via the internal communication line. It is to be noted that in this first stage microprocessor, since the received identification number f(f(n)) and the identification number f(n) stored during the execution of the first process do not match each other, this first stage microprocessor does not overwrite its present control program or control data stored in its nonvolatile memory.

Then, when the transmission operation from the first stage microprocessor to the second stage microprocessor is performed, with the execution of the second process, the second stage microprocessor receives the new control program or control data transmitted by the first stage microprocessor via the internal communication line along with the identification number f(f(n)) and transmits the received identification number f(f(n)) and new control program or control data via the internal communication line to the next stage microprocessor (i.e., the third stage microprocessor). It is to be noted that because the received identification number f(f(n)) and its self identification number f(f(n)) stored during the execution of the first process match each other in this case, the second stage microprocessor overwrites part or all of the control program or control data that is stored in the nonvolatile memory with the received new control program or control data.

Moreover, while the third stage microprocessor and its succeeding microprocessors also execute the second process as mentioned above and thereby transmits the identification number f(f(n)) and new control program or control data sequentially to the next stage microprocessor, in this example, because all of other microprocessors except for the second stage microprocessor have identification numbers which do not match the received identification number f(f(n)), there will be no overwriting in their control programs or control data.

Incidentally, although reference has been made in the foregoing explanation to the case of transmitting the identification number f(f(n)) from the external communication line to the electronic controller along with the new control program or control data and thereby overwriting the control program or control data of the second stage microprocessor with the new control program or control data, it is also possible to overwrite the control program or control data of any of the microprocessors in accordance with the identification number that is transmitted from the external communication line to the electronic controller along with the new control program or control data.

That is, the electronic controller described above adopts a construction called a "daisy chain" wherein each microprocessor is connected sequentially in series and it is arranged that through each microprocessor executing the second process and the identification number indicative of the microprocessor whose contents are to be overwritten and the new control program or control data are transmitted and received sequentially by each microprocessor and passed to the next microprocessor via the external communication line. Moreover, in this arrangement, the microprocessor whose control program or control data are to be overwritten has all or parts of its control program or control data overwritten with the new control program or control data. Also, in the foregoing arrangement, before executing the second process for performing the overwriting operation, each microprocessor executes the first process for storing as its own identification number the value obtained by performing the prescribed calculation on the identification number that is transmitted from the outside and for transmitting the calculated identification number (i.e., its self identification number) to the next stage microprocessor.

Therefore, there is no need to store identification numbers inside the nonerasable memory of each microprocessor unit or append the identification number to the control program or control data per se that is stored in the nonvolatile memory of the microprocessor. Thus, the control program and control data of each of the plurality of microprocessors can be overwritten in a very simple and reliable way. In addition, because the first and the second processes executed are completely the same for all microprocessor units, control and inventory of these microprocessors are much easier.

Incidentally, although flash EEPROMs or EEPROMs are used generally as the nonvolatile memories, other erasable ROMs may also be used.

A second aspect of the present invention provides an electronic controller whose microprocessor units execute a first process that is different from the one discussed above.

That is, in this arrangement, upon receipt of an overwriting command from outside, each microprocessor unit receives the identification number that is transmitted via the external communication line or internal communication line and stores the received identification number as its own identification number and transmits the identification number obtained by performing the predetermined calculation on the received identification number to the next stage microprocessor unit.

In this way, assuming that the identification number that is transmitted initially via the external communication line to the electronic controller is set as n, in the same way as in the case for the above-mentioned item (1), the first stage microprocessor that is connected to the external communication line stores n as its own identification number, the second stage microprocessor stores (f(n)) as its own identification number, and the third stage microprocessor stores the f(f(n))) as its own identification number. Accordingly, the present electronic controller differs from the electronic controller discussed above only in that the identification number of each microprocessor unit here is set to be the value of the received identification number and not the identification number obtained after performing the predetermined operation. In this way, the same effects as that with the previous aspect can be obtained with this arrangement.

Preferably, the first process also involves receiving an overwrite control program from outside with each of the microprocessor units executing the second process based on the overwrite control program.

In this way, there is no need to provide memory for storing the overwrite control program which is needed for executing the second process. Therefore, the amount of program to be stored in each microprocessor beforehand can be set to a minimum. It is to be noted that RAM or erasable ROM whose contents are not the target for overwriting is used for storing such an overwrite control program.

Preferably, the predetermined operation mentioned above is one of an addition and a subtraction operation. In this way, for example, if addition is performed, the correspondence between the order of connection of each microprocessor unit along the internal communication line and the identification number assigned to each microprocessor unit becomes easier to understand and thus, it will be easy to handle the electronic controller. Assuming that the identification number that is transmitted first from the external communication line to the electronic controller is n and the number added to it is x, in the case of the electronic controller described in the first aspect, the respective microprocessor units store (n+x), (n+2x), (n+3x), - - - as their own identification numbers and, in the case of the electronic microprocessor as claimed in the second aspect, similarly, the respective microprocessor units store n, (n+x), (n+2x), - - - as their own identification numbers.

Moreover, the numerical value to be added to the received identification number may be set to any arbitrary value which may be positive or negative. For example, the prescribed numerical value is preferably set to "+1".

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENT

A preferred embodiment of the present invention is described hereinafter with reference to the accompanying drawings.

Figure 1:
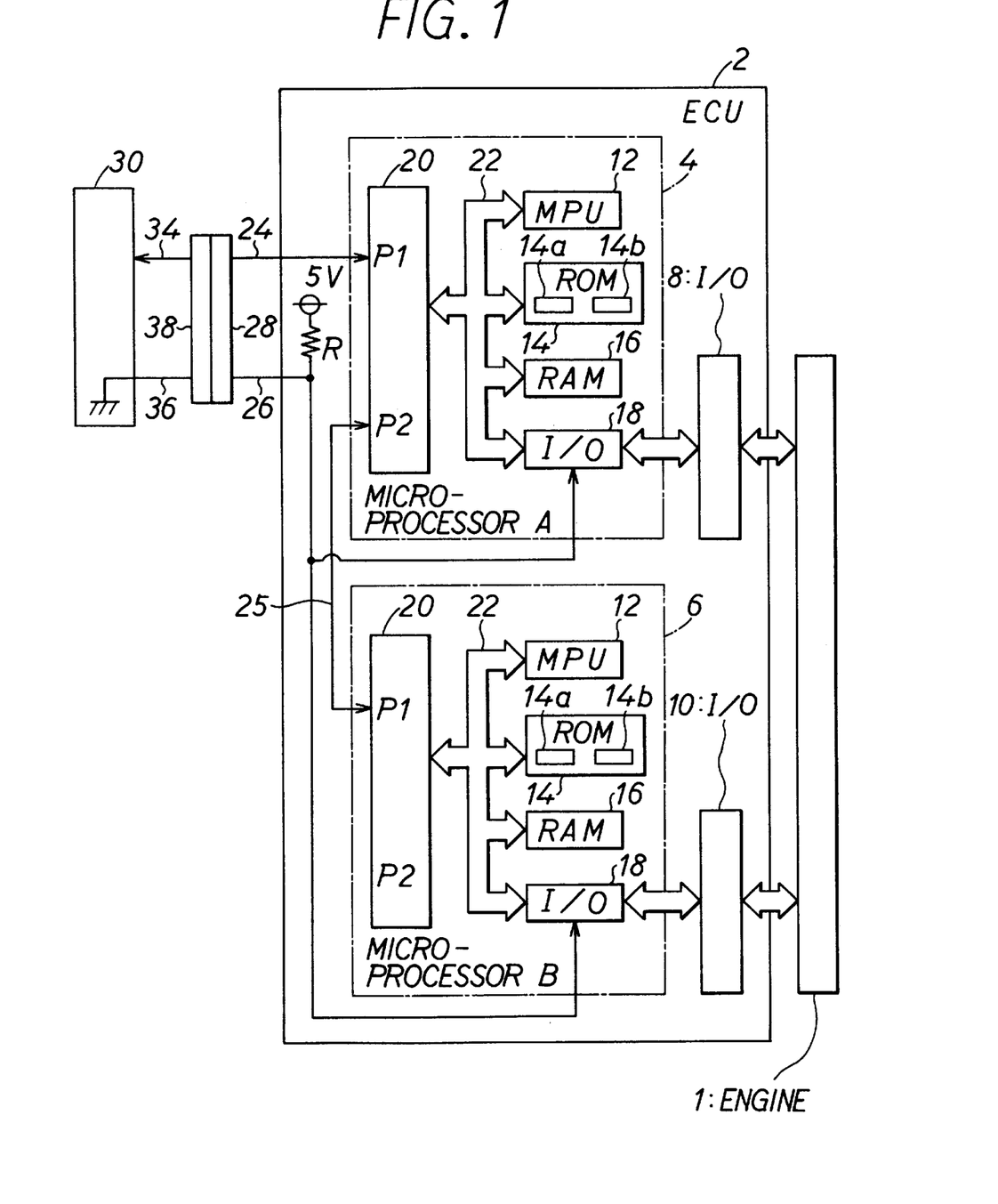
FIG. 1 is a block diagram illustrating an overall construction of an engine controller according to an embodiment of the present invention.

First, FIG. 1 is a block diagram illustrating an overall construction of an engine controller (hereinafter referred to also as "engine control unit" or simply "ECU") according to the preferred embodiment of the present invention. This ECU is installed in an automotive vehicle and performs control operations of an engine 1 of the vehicle.

As illustrated in FIG. 1, the ECU 2 includes a microprocessor unit 4 (hereinafter referred to as "A microprocessor"), a microprocessor unit 6 (hereinafter referred to as "B microprocessor"), an input/output circuit 8 and an input/output circuit 10. The A microprocessor 4 controls an electronic throttle valve (not shown) to adjust an amount of intake air of the engine 1. The B microprocessor 6 controls fuel injection and ignition timing of the engine 1. The input/output circuit 8 processes the signals from various sensors that are provided in the engine 1, provides the resulting signals to the A microprocessor 4 and receives the control signals from the A microprocessor 4 to open and close the electronic throttle valve. The input/output circuit 10 processes the signals from various sensors that are provided in the engine 1, provides the resulting signals to the B microprocessor 6 and receives the control signals from the B microprocessor 6 to drive an injector and an igniter that are installed in the engine 1.

The A microprocessor 4 and B microprocessor 6 have completely the same construction. In this way, each microprocessor 4 and 6 includes a microprocessing unit 12 (hereinafter referred to as "MPU"), a nonvolatile ROM 14, a RAM 16, an I/O port 18, a communication circuit 20 and a bus 22. The MPU 12 operates in accordance with various programs. The nonvolatile ROM 14 is for storing programs and data necessary for the operation of the MPU 12. The RAM 16 is for temporarily storing the calculation results of the MPU 12 and the like. The I/O port 18 is for performing transmission and reception of signals with the input/output circuits 8, 10 and the like. The communication circuit 20 is for executing serial data communication with external devices while the bus 22 is for connecting the above-mentioned components.

It is to be noted here that an electrically erasable/programmable flash EEPROM (more commonly known as flash ROM or flash memory) is used as the ROM 14 for each of the microprocessors 4 and 6. The memory region of the ROM 14 is divided into an erasable ROM region 14a that enables overwriting of the stored data and a nonerasable ROM region 14b in which overwriting of the data cannot be performed (or in which data overwriting is prohibited).

Also, the communication circuit 20 of each of the microprocessors 4 and 6 is provided with two communication ports P1 and P2. The communication port P1 of the A microprocessor 4 is connected to a serial communication line 24 that serves as an external communication line that extends to the outside. In contrast, the communication port P2 of the A microprocessor 4 is connected to the communication port P1 of the B microprocessor 6 via an internal communication line 25 that is disposed within the ECU 2. In this way, the A microprocessor 4 can communicate not only with the outside of the ECU 2 via the serial communication line 24 but also with the B microprocessor 6 via the internal communication line 25.

Meanwhile, in addition to the serial communication line 24, a mode determination signal line 26 extends from the ECU 2 to the outside. This mode determination signal line 26 is connected to a 5 V source within the ECU 2 via a resistor R and is also connected to the I/O ports 18 of both microprocessors 4 and 6.

A connector 28 is mounted at the ends of the serial communication line 24 and the mode determination signal line 26. The ECU 2 is connected to a memory overwriter 30 via this connector 28. The memory overwriter 30 is for overwriting the engine control program and data inside each of the microprocessors 4 and 6.

That is, when the connector 28 of the ECU 2 side and a connector 38 of the memory overwriter 30 side are engaged with each other, the serial communication line 24 of the ECU 2 side and a serial communication line 34 of the memory overwriter 30 side are connected with each other, and thus, serial communication between the ECU 2 (specifically, the A microprocessor 4) and the memory overwriter 30 can be executed. Furthermore, when both connectors 28 and 38 are engaged with each other, the mode determination signal line 26 of the ECU 2 side becomes connected to a signal line 36 that is connected to the ground (0 V) in the side of the memory overwriter 30, and as a result, the voltage level of the mode determination signal line 26 in the ECU 2 side changes from high (5 V) to low (0 V). Accordingly, if the mode determination signal line 26 is at a low level, each of the microprocessors 4 and 6 within the ECU 2 determines that the memory overwriter 30 has been connected to this ECU 2.

Next, the contents of the memory regions of the ROM 14 and RAM 16 which are built into each of the microprocessors 4 and 6 are described hereinafter with reference to FIG. 2.

Figure 2:
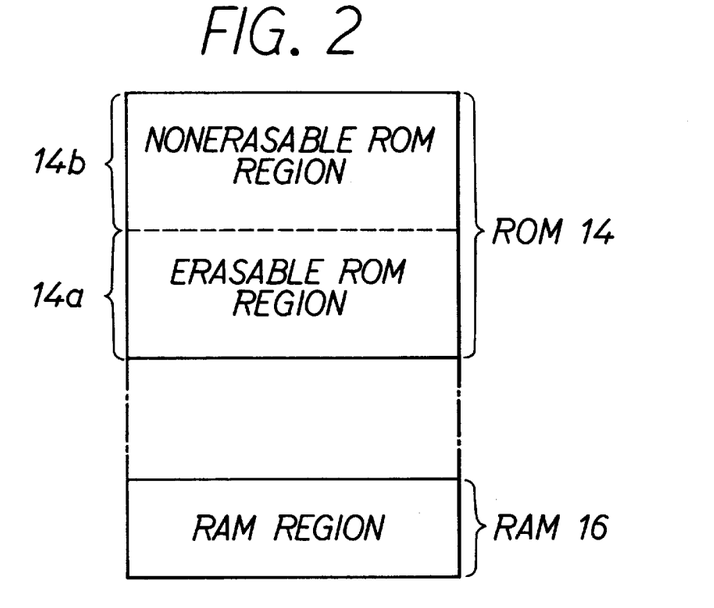
FIG. 2 is a diagram illustrating the contents of memory regions of a microprocessor that is installed in the engine controller of FIG. 1.

As illustrated in FIG. 2, an erasable ROM region 14a of the ROM 14 is used as a memory region for storing control codes. Control code as used hereinafter refers to control program and control data for controlling the engine 1. This ROM region 14a already contains the relevant control codes, i.e., control program and control data. It is to be noted here that the erasable ROM region 14a of the A microprocessor 4 stores the control program and control data for controlling the electronic throttle while the erasable ROM region 14a of the B microprocessor 6 stores the control program and data for controlling the fuel injection and ignition timing.

On the other hand, a nonerasable ROM region 14b of the ROM 14 is used as a memory region for storing a boot program that is executed after the CPU 2 is reset. This ROM region 14b already contains the relevant boot program.

Also, the RAM 16 is used for temporarily storing the calculation results of the MPU 12. Moreover, the RAM 16 also stores a ROM overwrite program that is transmitted from the memory overwriter 30 as will be described later.

In the ECU 2 that is constructed as described above, upon resetting, each of the microprocessors 4 and 6 starts the boot program that is stored in the nonerasable ROM region 14b of the ROM 14. During the ordinary state in which the memory overwriter 30 is not connected to the ECU 2, each of the microprocessors 4 and 6 uses the boot program to activate the control program which is stored in the erasable ROM region 14a and which is used in controlling the engine 1.

Figure 3:
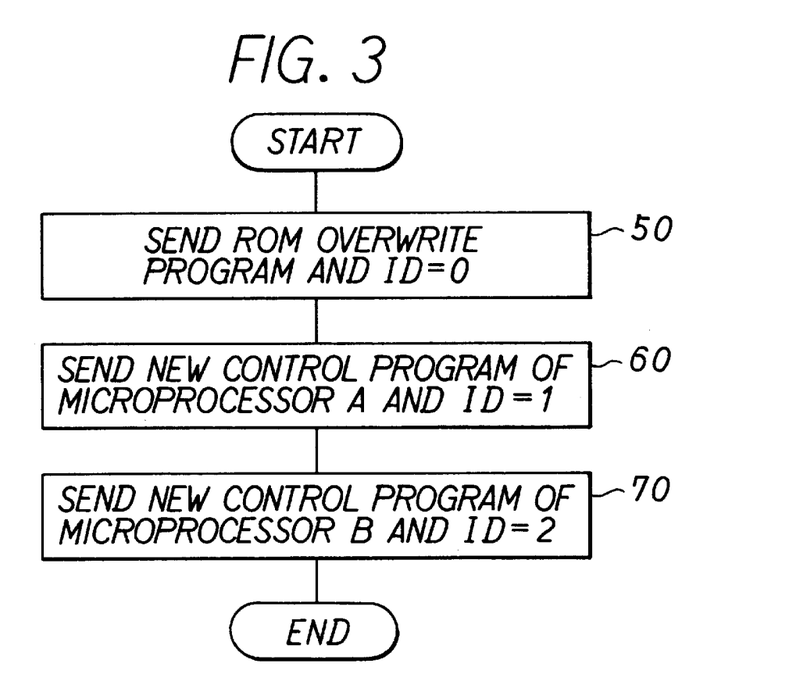
FIG. 3 is a flow chart illustrating a process that is executed by a memory overwriter that is connected to the engine controller of FIG. 1.

On the other hand, when the memory overwriter 30 is connected to the ECU 2 and after an operator performs the prescribed operations, this memory overwriter 30 executes a process that is illustrated in FIG. 3.

That is, first, step 50 reads out the ROM overwrite program from a storage medium (not shown) and sends this ROM overwrite program to the ECU 2 via the serial communication lines 34 and 24 along with an identification number ID whose value is "0".

Subsequent step 60 sends to the ECU 2 a new control program and control data that are to be stored in the erasable ROM 14a of the A microprocessor 4 together with an identification number which has a value of "1". This new control program and control data will replace the control program and control data that are presently stored in the A microprocessor 4. Furthermore, subsequent step 70 transmits to the ECU 2 the new control program and control data that are to be stored into the erasable ROM 14a of the B microprocessor 6 together with the identification number which has a value of "2". The new control program and control data will replace the control program and control data that are now stored in the B microprocessor 6.

In this case, after determining that the memory overwriter 30 is connected to the ECU 2 during the activation of the boot program, each microprocessor 4 and 6 of the ECU 2 executes the boot program as is without activating the control program within the erasable ROM 14a.

Then, first, each of the microprocessors 4 and 6 sets its own identification number ID based on the identification number ID (=0) that is transmitted from the memory overwriter 30 as mentioned above and stores the ROM overwrite program that is transmitted from the memory overwriter 30 along with the identification number ID in accordance with the identification number ID (=0) in the RAM 16. Thereafter, each of the microprocessors 4 and 6 overwrites the control program and control data that is stored in the erasable ROM 14a of the ROM 14 with the new control program and control data that are transmitted from the memory overwriter 30 by activating the ROM overwrite program that has been stored in the RAM 16.

Figure 4:
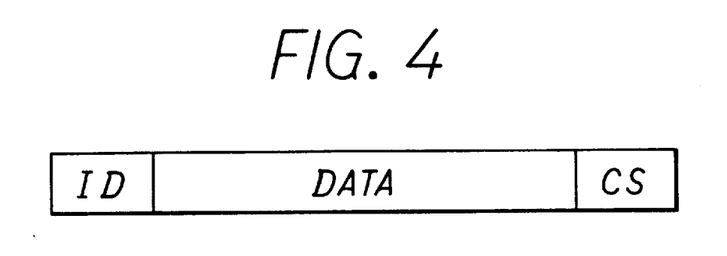
FIG. 4 is a diagram illustrating the format of a transmission signal from the memory overwriter.

In the present embodiment, it is to be noted that the signal that the memory overwriter 30 sends to the ECU 2 (specifically, the A microprocessor 4) and the signal that the A microprocessor 4 sends to the B microprocessor 6 follow a format such as that illustrated in FIG. 4. That is, one frame of the transmission signal is composed of an "ID" region which is a numerical value data region that stores the identification number ID that will be transmitted, a "DATA" region which is a region that stores the ROM overwrite program or the new control program and control data that will be transmitted and a "CS" region which is check data for detecting communication errors. The ROM overwrite program and the new control program and control data are transmitted and received at all times along with the identification number ID.

Meanwhile, the processes that are executed in each of the microprocessors 4 and 6 of the ECU 2 are explained hereinafter with reference to the flow chart of FIG. 5. It must be noted in FIG. 5 that steps 100 to 160 are executed by the boot program in the nonerasable ROM region 14b, step 200 is executed by the control program in the erasable ROM region 14a, and steps 300 to 330 are executed by the ROM overwrite program that is sent by the memory overwriter 30 and stored in the RAM 16.

Figure 5:
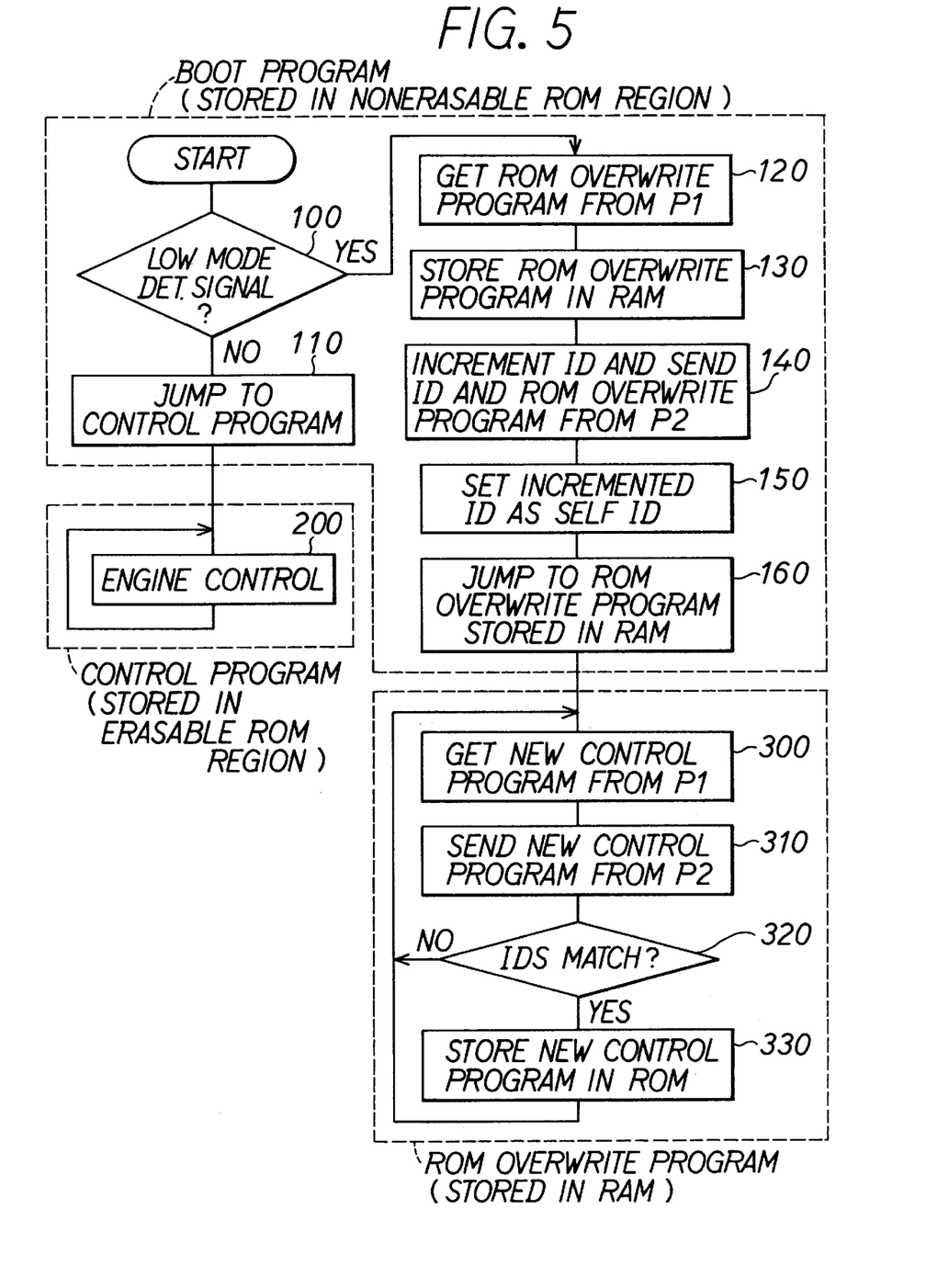
FIG. 5 is a flow chart illustrating a process that is executed in each microprocessor of the electronic controller.

As illustrated in FIG. 5, after supplying power to the ECU 2 and subsequent start of operations of the ECU 2 after its resetting, each of the microprocessors 4 and 6 first activates the boot program that is stored in the nonerasable ROM region 14b of the ROM 14.

First, step 100 determines whether the mode determination signal line 26 is at a low level or not. If step 100 determines that this signal line 26 is not at a low level, i.e., the memory overwriter 30 is not connected to the ECU 2, control goes to subsequent step 110 which transfers control to the control program that is stored in the erasable ROM region 14a of the ROM 14.

Then, through the execution of this step 110, control goes to step 200 which activates the control program within the erasable ROM 14a and thus, engine control is performed following the existing control program and control data. It is to be noted that the engine control process of step 200 involves calculating an optimal control amount or an optimal control timing based on various sensor signals from the input/output circuit 8 or 10 and control data in the erasable ROM region 14a and providing control signals based on the calculated results for driving the actuators of the electronic throttle, injector, igniter or the like. An optimal level of operation in the engine 1 can be achieved with the execution of this engine control process.

On the other hand, when step 100 determines that the signal of the mode determination signal line 26 is low during the execution of the boot program, then it is determined that the memory overwriter 30 is connected and thus control goes to step 120.

Step 120 receives the identification number ID and ROM overwrite program that are transmitted to the communication port P1 of the communication circuit 20 via the serial communication line 24 or the internal communication line 25. Subsequent step 130 stores the ROM overwrite program in the RAM 16. Step 140 increments by one the identification number ID that has been received along with the ROM overwrite program. Then, step 140 transmits the incremented identification number ID along with the received ROM overwrite program from the communication port P2 of the communication circuit 20. Subsequent step 150 sets the incremented identification number ID, which has been incremented by one in step 140, as its own identification number ID and stores the identification number in an internal storage region.

After each of the microprocessors 4 and 6 completes the storage of its own identification number ID as mentioned above, control proceeds to step 160 which performs jumping to an address for activating the ROM overwrite program stored in the RAM 16. Then, through the execution of this step 160, the ROM overwrite program is activated. Thereafter, as shown in steps 300 to 330 of FIG. 5, an overwriting process is executed for replacing the contents of the erasable ROM region 14a with the new control program and control data sent by the memory overwriter 30.

That is, when the ROM overwrite program is activated, first, step 300 receives in the communication port P1 of the communication circuit 20 the identification number ID, new control program and new control data that have been transmitted via the serial communication line 24 or internal communication line 25. Subsequent step 310 sends the received identification number ID and new control program and control data as is from the communication port P2 of the communication circuit 20.

Subsequent step 320 determines whether the identification number ID received in step 300 along with the new control program and control data matches the microprocessor's own identification number ID that has been stored in step 150. When step 320 determines that both identification numbers do not match each other, the microprocessor determines that the new control program and control data received in step 300 are not addressed to itself, and so control goes back to step 300.

On the other hand, when step 320 determines that both identification numbers ID match each other, the microprocessor determines that the new control program and new control data received in step 300 are directed to itself and thus writes the received new control program and new control data into the erasable ROM region 14a of the ROM 14 in replacement of the control program and control data that are presently stored therein. Thereafter, control goes back to step 300.

It is to be noted that the overwriting process of step 330 involves, for example, erasing all data presently stored in the erasable ROM region 14a and storing the received new control program and control data therein.

Next, the overwriting of the control program and control data in each of the microprocessors 4 and 6 of the ECU 2 of the present embodiment which is performed by each of the microprocessors 4 and 6 by executing the process shown by the flow chart of FIG. 5 is explained hereinafter with reference to FIG. 6.

First, after the memory overwriter 30 is connected to the ECU 2 with power being supplied to the ECU 2, as has been explained in connection with step 50 of FIG. 3, the identification number ID (=0) and ROM overwrite program are transmitted from the memory overwriter 30 to the ECU 2 via the serial communication lines 34 and 24 and the A microprocessor 4 receives in the communication port P1 the identification number ID (=0) and the ROM overwrite program that are transmitted via the serial communication line 24 (step 120).

Then, the A microprocessor 4 stores the received ROM overwrite program in the RAM 16 (step 130, not shown) and further transmits the incremented identification number ID (=1), which is obtained by incrementing by one the identification number ID (=0) received along with the ROM overwrite program, from the communication port P2 to the B microprocessor 6 via the internal communication line 25 along with the received ROM overwrite program (step 140). It also stores the incremented identification number ID (=1) as its own identification number ID (step 150, not shown). Control then goes to the ROM overwrite program that has been stored in the RAM 16 (step 160, not shown) and thus, steps 300 to 330 are activated.

Figure 6:
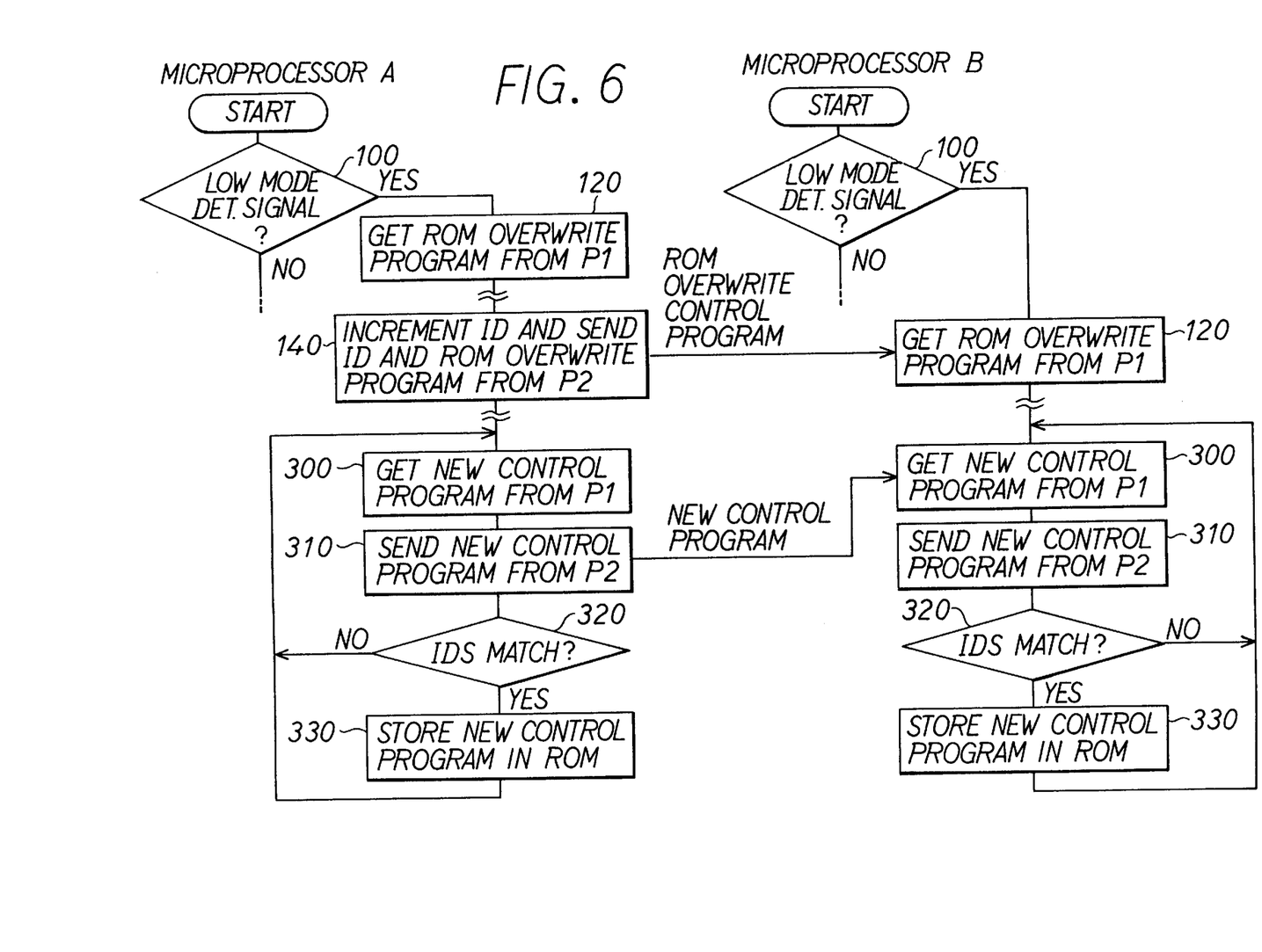
FIG. 6 is a diagram illustrating the procedure for overwriting the control program and control data in each microprocessor of the electronic controller.

Then, as illustrated in FIG. 6, when the A microprocessor 4 executes step 140 and thereby transmits the ROM overwrite program to the B microprocessor 6 along with the identification number ID (=1), the B microprocessor 6 executes step 120 for receiving in its communication port P1 the identification number ID (=1) and ROM overwrite program sent by the A microprocessor 4 via the internal communication line 25.

The B microprocessor 6 stores the received ROM overwrite program into the RAM 16 in completely the same way as that of the A microprocessor 4 (step 130, not shown). Then, the B microprocessor 6 increments by one the identification number ID (=1) received along with the ROM overwrite program to obtain the identification number (=2), generates the identification number (=2) and the control program from the communication port P2 along with the received ROM overwrite program (step 140, not shown), and stores the incremented identification number ID (=2) as its own identification number ID (step 160, not shown). Thereafter, control goes to the ROM overwrite program stored in the RAM 16 (step 160, not shown) which starts the execution of steps 300 to 330.

Incidentally, in the present embodiment, because there is no microprocessor connected to the communication port P2 of the B microprocessor 6, the generation of signals from the communication port P2 of the B microprocessor 6 has no particular meaning. However, if the communication port P1 of an additional microprocessor having the same construction as that of the microprocessors 4 and 6 is connected to the communication port P2 of the B microprocessor 6, that additional microprocessor will execute completely the same process as that of the B microprocessor 6.

When the ROM overwrite program is transmitted from the memory overwriter 30 to the ECU 2 along with the identification number ID (=0) as mentioned above, each of the microprocessors 4 and 6 sequentially executes steps 120 to 160. As a result, as counted from the serial communication line 24, the first stage A microprocessor 4 stores the identification number ID (=1) as its own identification after incrementing the identification number ID (=0) sent by the memory overwriter 30. In addition, the second stage B microprocessor 6 stores the identification number ID (=2) as its own identification number after incrementing the identification number ID (=1) sent by the A microprocessor 4. Thus, the microprocessors 4 and 6 store identification numbers that correspond to their order of connection along the internal communication line 25. Furthermore, simultaneous with the above-mentioned setting and storing of its own identification number ID, each of the microprocessors 4 and 6 stores the ROM overwrite program from the memory overwriter 30 into its own RAM 16 and activates this ROM overwrite program.

Thereafter, as has been explained in connection with the step 60 of FIG. 3, when the identification number ID (=1) and new control program and control data intended for the A microprocessor 4 are transmitted from the memory overwriter 30 to the ECU 2 via the serial communication lines 34 and 24, first, the A microprocessor 4 receives in its communication port P1 the identification number ID (=1) and new control program and control data that have been transmitted via the serial communication line 24 (step 300). Then, the A microprocessor transmits the received identification number ID (=1) and new control program and control data as is from its communication port P2 to the B microprocessor 6 via the internal communication line 25 (step 310). In this case, because the identification number ID (=1) received in step 300 and its own identification number ID (=1) stored in step 150 match each other (i.e., step 320 gives a positive output), the A microprocessor 4 overwrites (step 330) the control program or control data that are presently stored in the erasable ROM region 14a of the ROM 14 with the new control program or new control data received in step 300. Thereafter, the A microprocessor 4 is switched to a reception mode (step 300).

Thereafter, as illustrated in FIG. 6, after the A microprocessor 4 executes step 310 which sends to the B microprocessor 6 the identification number ID (=1) and new control program and control data it received from the memory overwriter 30, the B microprocessor 6 executes step 300 for receiving in the communication port P1 the identification number ID=1 and new control program and control data sent by the A microprocessor 4 via the internal communication line 25.

The B microprocessor 6 subsequently transmits the received identification number ID (=1) and new control program and control data as is from the communication port P2 (step 310). Thereafter, because the identification number ID (=1) received in step 300 and its own identification number ID (=2) stored in step 150 do not match each other (i.e., step 320 gives a negative output), the B microprocessor 6 reverts back to a reception mode without overwriting the contents of the erasable ROM region 14a (step 300).

On the other hand, furthermore, as has been explained in connection with step 70 of FIG. 3, when the identification number ID=2 and the new control program and new control data intended for the B microprocessor 6 are transmitted from the memory overwriter 30 to the ECU 2 via the serial communication lines 34 and 24, first, the A microprocessor 4 executes steps 300 and 310 to receive in its communication port P1 the identification number ID (=2) and new control program and control data transmitted from the memory overwriter 30 and to transmit the same as is from the communication port P2 to the B microprocessor 6. In this case, because the received identification number ID (=2) and its own identification number ID (=1) do not match each other (i.e, step 320 gives a negative output), the A microprocessor 4 reverts back to a reception mode without overwriting the contents of the erasable ROM region 14a (step 300).

When the identification number ID(=2) and new control program and control data from the memory overwriter 30 are transmitted from the A microprocessor 4 to the B microprocessor 6, the B microprocessor 6 also executes steps 300 and 310 to thereby receive in its communication port P1 the identification number ID (=2) and new control program and control data transmitted from the A microprocessor 4 and transmit the same as is from the communication port P2. In this case, because its received identification number ID (=2) and its own identification number ID (=2) match each other (i.e., step 320 gives a positive output), the B microprocessor 6 overwrites the contents of the erasable ROM region 14a with the received new control program and control data and then reverts back to a reception mode (step 300).

As explained above, the ECU 2 of the present embodiment, the respective communication circuits 20 of the microprocessors 4 and 6 are connected sequentially in series from the serial communication line 24. In this way, the ECU 2 of the present invention adopts a daisy chain connection.

With each microprocessor 4 and 6 executing steps 300 to 330 of FIG. 5, the identification number (ID=1 or ID=2), which indicates the microprocessor whose contents are to be overwritten, and the new control program and control data transmitted from the memory overwriter 30 are sequentially received and transmitted by each microprocessor 4 and 6. Also, among microprocessors 4 and 6, only the microprocessor which possesses the identification number representing the microprocessor to be overwritten has the contents of its erasable ROM region 14a overwritten with the new control program and control data transmitted by the memory overwriter 30.

In particular, in the ECU 2 of the present embodiment, before the execution of steps 300 to 330, each of the microprocessors 4 and 6 executes steps 120 to 150 to increment the identification number received in its communication port P1 by adding one to the identification number, storing the incremented identification number as its own identification number and sending the same incremented identification number from the communication port P2 to the next stage microprocessor. Through the execution of steps 120 to 150, each of the microprocessors 4 and 6 stores the identification number that corresponds to its order of connection order along the internal communication line 25 inside the ECU 2.

Therefore, according to the present embodiment, there is no need to, for example, store beforehand an identification number in the nonerasable ROM region 14b of each of the microprocessors 4 and 6 or append the identification number beforehand to the control program and control data that are stored in the erasable ROM region 14a of each of the microprocessors 4 and 6. In the present embodiment, one must merely take note of the connection order of each of the microprocessors 4 and 6 of the ECU 2 along the internal communication line 25 and thus, in this way, overwriting of the control programs and control data of each of the two microprocessors 4 and 6 can be performed. Therefore, according to the ECU 2 of the present embodiment, overwriting of the control program and control data of a plurality of microprocessors 4 and 6 can be executed in a very simple and reliable way.

Although the present invention has been fully described in connection with a preferred embodiment thereof with reference to the accompanying drawings, it is to be noted that various changes and modifications will become apparent to those skilled in the art.

For example, although the foregoing explanation specifies that the memory overwriter 30 initially transmits the identification number ID whose value is 0 in step 50 of FIG. 3 and that the identification numbers of the microprocessors 4 and 6 are thus set to 1 and 2, respectively, the value of the identification number that is initially transmitted from the memory overwriter 30 may be set to an arbitrary number n. Accordingly, the identification numbers of the microprocessors 4 and 6 may be set to n+1 and n+2, respectively.

Moreover, while the above-mentioned embodiment increments the received identification number by 1 in step 140 of FIG. 5, the identification number may be incremented with values aside from one. Also, it may also be that step 140 performs another type of calculation wherein, for example, the received identification number is multiplied by a prescribed numerical value. That is, if the calculation that is to be performed by the ECU 2 on the identification number it receives from the memory overwriter 30 is known beforehand, the identification number of each of the microprocessor 4 and 6 can be determined based on the value n of the identification number initially transmitted by the memory overwriter 30. In this way, the overwriting of the control program and the control data in the microprocessors 4 and 6 can be performed by transmitting the new control program and control data from the memory overwriter 30 to the ECU 2 along with the identification number of the microprocessors 4 and 6.

Meanwhile, according to the ECU 2 of the present embodiment, since the boot programs (i.e., steps 100 to 160) that are executed by the microprocessors 4 and 6 have completely the same contents, the management and inventory of these microprocessors 4 and 6 become very simple.

Also, in the ECU 2 of the present embodiment, through the execution of steps 120 to 150, each of the microprocessors 4 and 6 receives the ROM overwrite program along with the identification number and stores these in the RAM 16, sends the received ROM overwrite program to the next stage microprocessor along with the incremented identification number that results when the received identification number is incremented by one, and thereafter activates the ROM overwrite program stored in the RAM 16.

That is, in the ECU 2 of the present embodiment, the ROM overwrite program is not stored at the outset in each of the microprocessors 4 and 6. Here, each of the microprocessors 4 and 6 receives this ROM overwrite program from the outside, stores it in the RAM 16 and activates this ROM overwrite program to execute steps 300 to 330. In this way, programs to be built in each microprocessor 4 and 6 beforehand can be made small, thereby saving memory space.

Incidentally, the ROM overwrite program for executing steps 300 to 330 may be stored beforehand as part of the boot program in the nonerasable ROM region 14b of the ROM 14 so that the reception and transmission of only the identification number ID is performed in steps 120 to 150.

Meanwhile, in the above-mentioned embodiment, each microprocessor 4 and 6 stores as its own identification number the ID obtained by adding one to the identification number received from the communication port P1 and transmits the resulting incremented identification number from the communication port P2 to the next stage microprocessor. Besides the foregoing arrangement, it may also be that each of the microprocessors 4 and 6 stores the identification number received in each respective communication port P1 as is as its own identification number and then increments the received identification number before sending the incremented identification number to the next stage microprocessor from the communication port P2.

Specifically, step 150 of FIG. 5 may be modified to store the identification number received in step 120 as is without adding one to the same identification number.

In this way, when the value of the identification number ID that is to be initially transmitted from the memory overwriter 30 to the ECU 2 is set to be n, the A microprocessor 4 stores the identification number ID (=n) from the memory overwriter 30 as is as its own identification number while the second stage B microprocessor stores the identification number (n+1) as its own identification number. Therefore, the above arrangement differs from the ECU 2 of the above-mentioned embodiment only in that the identification number of each of the microprocessors 4 and 6 is set to be smaller by one than the identification number of each of the microprocessors 4 and 6 in the original arrangement.

Accordingly, if the memory overwriter 30 transmits the identification number ID (=1) in step 50 of FIG. 3, the identification number of the A microprocessor 4 becomes 1 while the identification number of the B microprocessor 6 becomes 2 which is the same as that of the above-described preferred embodiment. Thus, the same effects as that obtained with the above-mentioned preferred embodiment can be obtained with the foregoing arrangement.

Furthermore, although the ECU 2 of the above-mentioned embodiment has been that which is equipped with two microprocessors 4 and 6, the ECU may have three or more microprocessor units. For instance, when there are three microprocessor units, the communication port P2 of the B microprocessor 6 should be connected with the communication port P1 of a third microprocessor unit using an internal communication line that is separate from the internal communication line 25 of FIG. 1.

On the other hand, furthermore, although the above-mentioned embodiment has been explained with reference to overwriting all the control program and control data stored in the erasable ROM region 14a, it goes without saying that the above-described embodiment works perfectly the same for the case when only parts of the control program and control data are to be overwritten.

In addition, although the above-mentioned embodiment centers on the application of the ECU 2 to the execution of engine control, the present invention is not limited to such application and may be used for other various purposes. That is, the present invention may also be applied to an electronic controller for controlling targets such as a brake, transmission, suspension or the like.

Such changes and modifications are to be understood as being within the scope of the present invention as defined by the appended claims.

What is claimed is:

1. An electronic controller for performing control operations based on control codes, said electronic controller comprising a first microprocessor unit that includes:

a first nonvolatile programmable memory for storing a first control code;

first detection means for detecting a control code overwrite command and a new control code from outside of said first microprocessor unit, said new control code including a new control code identification code;

first transmission means for transmitting said control code overwrite command to outside of said first microprocessor unit;

first identification code setting means for setting a first identification code of said first microprocessor unit when said first detection means detects said control code overwrite command;

first determination means for determining if said new control code identification code of said new control code detected by said first detection means matches said first identification code set by said first identification code setting means; and first overwriting means for overwriting said first control code stored in said first nonvolatile programmable memory with said new control code in response to a result of a determination by said first determination means.

2. An electronic controller according to claim 1, said electronic controller further comprising a second microprocessor unit that includes:

a second nonvolatile programmable memory for storing a second control code;

second detection means for detecting a control code overwrite command and a new control code from outside of said second microprocessor unit, said new control code including a new control code identification code;

second identification code setting means for setting an identification code of said second microprocessor unit when said second detection means detects said control code overwrite command;

second determination means for determining if said new control code identification code of said new control code detected by said second detection means matches said identification code set by said second identification code setting means; and second overwriting means for overwriting said second control code stored in said second nonvolatile programmable memory with said new control code in response to a result of a determination by said second determination means.

3. An electronic controller according to claim 2, wherein each identification code setting means is for setting an identification code of its corresponding microprocessor unit based on a predetermined operation.

4. An electronic controller according to claim 3, wherein each identification code setting means is for setting said identification code of its corresponding microprocessor unit by performing said predetermined operation on an overwrite identification code transmitted from outside of said corresponding microprocessor unit.

5. An electronic controller according to claim 4, said electronic controller further comprising an internal communication line for connecting a plurality of microprocessor units including said first and said second microprocessor units to form a sequence of said microprocessor units, wherein said transmission means of each microprocessor unit, except for a last microprocessor unit in said sequence, is further for sending said identification code to a next microprocessor unit in said sequence.

6. An electronic controller according to claim 5, wherein said identification code corresponds to a position of said corresponding microprocessor unit in said sequence.

7. An electronic controller according to claim 5, wherein each overwriting means is for overwriting said control code stored in its corresponding nonvolatile programmable memory with said new control code when its corresponding determination means determines that said identification code set by its corresponding identification code setting means matches said new control code identification code.

8. An electronic controller according to claim 4, wherein said predetermined operation is one of an addition and a subtraction operation.

9. An electronic controller according to claim 2, wherein each identification code setting means is for setting an overwrite identification code transmitted from outside of its corresponding microprocessor unit as said identification code and further for performing a predetermined operation on said overwrite identification code to obtain a computed identification code which is transmitted by its corresponding transmission means to outside of said corresponding microprocessor unit.

10. An electronic controller according to claim 9, wherein said predetermined operation is one of an addition and a subtraction operation.

11. An electronic controller according to claim 9, said electronic controller further comprising an internal communication line for connecting a plurality of microprocessor units including said first and said second microprocessor units to form a sequence of said microprocessor units, wherein said transmission means of each microprocessor unit, except for a last microprocessor unit in said sequence, is further for sending said computed identification code to a next microprocessor unit in said sequence.

12. An electronic controller according to claim 11, wherein each overwriting means is for overwriting said control code stored in its corresponding nonvolatile programmable memory with said new control code when its corresponding determination means determines that said identification code set by its corresponding identification code setting means matches said new control code identification code.

13. An electronic controller according to claim 2, wherein at least one of said microprocessor units is coupled to an engine of a vehicle to control said engine.

14. A method for overwriting control codes of an electronic controller that includes a plurality of microprocessor units that store said control codes, said method comprising the steps of:

receiving a control code overwrite command from outside said electronic controller;

assigning an identification code to respective microprocessor units when said control code overwrite command is received;

receiving a new control code, which includes a new control code identification code, from outside said electronic controller; and subsequently overwriting a control code of a microprocessor unit among said plurality of microprocessor units whose identification code matches said new control code identification code of said new control code.

15. A method for overwriting control codes of an electronic controller according to claim 14, wherein said step of assigning said identification codes involves assigning an identification code that is computed based on a predetermined operation.

16. A method for overwriting control codes of an electronic controller according to claim 15, wherein:

said step of receiving said control code overwrite command includes a step of receiving an overwrite identification code from outside said electronic controller, and said step of assigning said identification codes includes a step of computing each of said identification codes based on said overwrite identification code received from outside of said respective microprocessor unit.

17. A method for overwriting control codes of an electronic controller according to claim 16, wherein:

said plurality of microprocessor units are connected in series to form a sequence; and said method additionally comprises the step of sending said identification code computed by each microprocessor unit, except a last microprocessor unit in said sequence, to a succeeding microcomputer unit in said sequence.

18. A method for overwriting control programs of an electronic controller according to claim 16, wherein said step of assigning said identification codes involves assigning said identification codes to respective microprocessor units based on an order of each of said microprocessor units in said sequence.

19. A method for overwriting control programs of an electronic controller according to claim 15, wherein said predetermined operation is one of an addition and a subtraction operation.

20. A method for overwriting control programs of an electronic controller according to claim 14, wherein:

said plurality of microprocessor units are connected in series to form a sequence, said step of receiving said control code overwrite command includes a step of receiving an overwrite identification code from outside said electronic controller, and said step of assigning said identification codes includes the steps of:

assigning said overwrite identification code received from outside said electronic controller as said identification code only to a first microprocessor unit in said sequence, performing a predetermined operation on said overwrite identification code to obtain a computed code, and sending said computed code to a succeeding microprocessor unit except a computed code of a last microprocessor unit in said sequence.

21. A method for overwriting control codes in a microprocessor unit of an electronic controller, said method comprising the steps of:

receiving a control code overwrite command from outside said microprocessor unit;

setting an identification code of said microprocessor unit when said control code overwrite command is received;

receiving a new control code, which includes a new control code identification code, from outside said microprocessor unit; and subsequently overwriting a control code when said identification code matches said new control code identification code of said new control code.

22. A method for overwriting control codes in a microprocessor unit of an electronic controller according to claim 21, wherein said step of setting said identification code is performed by receiving an overwrite code from outside said microprocessor unit and performing a predetermined operation on said overwrite code to derive said identification code.

23. A method for overwriting control codes in a microprocessor unit of an electronic controller according to claim 22, wherein said predetermined operation is one of an addition and a subtraction operation.

24. An electronic controller for performing control operations based on control codes, said electronic controller comprising:

a plurality of microprocessor units, each of said microprocessor units including nonvolatile memory for storing said control codes; and a common communication line for connecting said plurality of microprocessor units in series to form a sequence;

wherein:
each microprocessor unit includes first processing means for executing a first process when an overwrite command is received from outside said microprocessor unit and second processing means for executing a second process when a new control code is received from outside said microprocessor unit, said new control code including a new control code identification code;

each first processing means is for executing said first process which involves receiving an overwrite identification code from outside its corresponding microprocessor unit, performing a predetermined operation on said overwrite identification code to obtain a processed code, setting said processed code as a self identification code of said corresponding microprocessor unit and sending said processed code to a next microprocessor unit in said sequence, each first processing means, except a first processing means of a last microprocessor unit in said sequence, being for sending said processed code to a next microprocessor unit in said sequence; and each second processing means is for executing said second process which involves sending said new control code to a next microprocessor unit in said sequence, determining if said new identification control code matches said self identification code of its corresponding microprocessor unit and overwriting said control code stored in said nonvolatile memory of said corresponding microprocessor unit when said new identification control code matches said self identification code, each second processing means, except a second processing means of a last microprocessor unit in said sequence, being for sending said new control code to a next microprocessor unit in said sequence.

25. An electronic controller according to claim 24, wherein:
said first process executed by each first processing means also involves receiving an overwrite control program from outside a corresponding microprocessor unit, and each microprocessor unit is for executing said second process based on said overwrite control program.

26. An electronic controller according to claim 24, wherein said predetermined operation is one of an addition and a subtraction operation.

27. An electronic controller for performing control operations based on control codes, said electronic controller comprising:
a plurality of microprocessor units, each of said microprocessor units including nonvolatile memory for storing said control codes; and a common communication line for connecting said plurality of microprocessor units in series to form a sequence;

wherein:
each microprocessor unit includes first processing means for executing a first process when an overwrite command is received from outside said microprocessor unit and second processing means for executing a second process when a new control code is received from outside said microprocessor unit, said new control code including a new identification control code, each first processing means is for executing said first process which involves receiving an overwrite identification code from outside its corresponding microprocessor unit, setting said overwrite identification code as a self identification code of said corresponding microprocessor unit, performing a predetermined operation on said overwrite identification code to obtain a processed code and sending said processed code to a next microprocessor unit in said sequence, each first processing means, except a first processing means of a last microprocessor unit in said sequence, being for sending said processed code to a next microprocessor unit in said sequence; and each second processing means is for executing said second process which involves sending said new control code to a next microprocessor unit in said sequence, determining if said new identification control code matches said self identification code of its corresponding microprocessor unit and overwriting said control code stored in said nonvolatile memory of said corresponding microprocessor unit when said new identification control code matches said self identification code, each second processing means, except a second processing means of a last microprocessor unit in said sequence, being for sending said new control code to a next microprocessor unit in said sequence.

28. An electronic controller according to claim 27, wherein:
said first process executed by each first processing means also involves receiving an overwrite control program from outside its corresponding microprocessor unit, and each microprocessor unit is for executing said second process based on said overwrite control program.

29. An electronic controller according to claim 27, wherein said predetermined operation is one of an addition and a subtraction operation.

* * * * *